United States Patent [19]
Evans et al.

[11] Patent Number: 5,084,947
[45] Date of Patent: Feb. 4, 1992

[54] SNAP RELEASE ATTACHMENT SYSTEM

[75] Inventors: Jack Evans; Christopher R. Morley, both of Mokena, Ill.

[73] Assignee: Cellular IC, Mokena, Ill.

[21] Appl. No.: 542,692

[22] Filed: Jun. 25, 1990

[51] Int. Cl.⁵ .......................................... A44B 17/00
[52] U.S. Cl. .................................................... 24/658
[58] Field of Search ................... 24/652, 630, 656–658, 24/605, 697.1

[56] References Cited

U.S. PATENT DOCUMENTS

| | | | |
|---|---|---|---|
| 966,544 | 8/1910 | Heaton | 24/658 |
| 1,055,440 | 3/1913 | Boden | 24/658 |
| 1,106,359 | 8/1914 | Bergner | 24/630 |
| 1,275,357 | 8/1918 | Arlen | 24/657 |
| 1,296,427 | 3/1919 | Ramshaw | 24/658 |
| 1,772,854 | 8/1930 | Borresen | 24/658 |

FOREIGN PATENT DOCUMENTS

| | | | |
|---|---|---|---|
| 7274 | 1/1905 | Denmark | 24/658 |
| 625080 | 8/1927 | France | 24/656 |

Primary Examiner—James R. Brittain
Attorney, Agent, or Firm—Hawes & Fischer

[57] ABSTRACT

The snap release system consists of interfitting base and top members, the base member including a catch plate, the top plate having a T-shaped stud that is captured in aligned openings in the base plate and catch plate. The catch plate includes a bar portion lying alongside the base plate, which bar may be pressed to release the head of the T-shaped stud and to permit the plates to be separated.

9 Claims, 2 Drawing Sheets

SNAP RELEASE ATTACHMENT SYSTEM

BACKGROUND OF THE INVENTION

The present invention relates to a system and structure for attaching one element to another, the system providing a set of flat plates that are connected together in such a fashion that they may be easily released, then snapped back together in a self aligning manner. The system is are particularly useful in connecting the base of a cellular telephone to its support.

A variety of different structures have been developed for releasably connecting one element to another. Some of these structures consist of two flat plates that interfit in such a fashion that they may be interconnected and released as desired. For example, one such structure which has been developed to attach a cellular telephone to its base consists of two interfitting plates that include, on one plate, upstanding bosses and on the other plate pockets to receive the bosses to assist in aligning the plates as they are being interfitted. One plate also includes an upstanding centrally located T-shaped stud, the head of the T projecting through an opening in the other plate to be captured, when it is desired to attach the two plates to one another, by moving a slide from a first position to a second position, the slide in the first position permitting the head of the stud to move through the opening, while in the second position capturing the head of the stud in that opening. Thus, by moving the slide back and forth it is possible to connect the two plates together, or to release the two plates from one another, as desired. One of these plates may be attached to the base of a cellular telephone, and the other to a base or mounting plate for supporting the cellular telephone. Thus, to release the cellular telephone from the mount the plates may be disengaged from one another by moving the slide in an appropriate direction. When it is desired to reattach the plates to one another the user places the two plates together again, then moves the plate back into a position to capture the head of the stud in the opening.

A significant deficiency of such a releasable connector system is that the plates may not be reconnected simply by snapping them together. Instead, the user is required to make sure that the slide is in the correct orientation to permit two plates to be reconnected, then after the plates are interfitted to move the slide from this first (or open) orientation to the orientation in which the head of the stud is captured to reconnect the plates.

Accordingly, one object of the present invention is to provide a snap release attachment system or structure that consists of two interfitting plates and which permits the two plates, when separated, to be reengaged with one another simply by pressing them together; it is not necessary for the user to move any slide from a first to a second position to reattach the plates. Another object of the present invention is to provide such a snap release attachment system that permits the user to separate the two plates by momentarily depressing a catch. A third object of the present invention is to provide a simple, economically manufactured snap release attachment system. A further object of the present invention is to provide such a system in which the plates may be connected, or reconnected, with one another in either of at least two orientations, for example two orientations in which the plates turned 180 degrees with respect to one another. Other objects of the present invention will be apparent to those skilled in this art from the following detailed description of a preferred embodiment.

BRIEF SUMMARY

The snap release attachment system of the present invention for connecting a first element to a second element comprises a planar base member that may be connectable to the first element, and a planar top member that is connectable to the second element. One of the members has a projecting stud; the other of the members has a socket for receiving the stud when the members are in a face to face orientation, and also carries release means normally in a first position that may be depressed to a second position to release the stud from the socket, and spring means to return the release means to the first position. Preferably the plates, socket and stud are shaped to permit the stud to be received in the socket, and the plates attached to one another, in any of a plurality of face to face orientations. Also, means preferably are provided in the two members for aligning them as they are brought together in a face to face orientation. In addition, preferably the means for releasably holding the stud in the socket includes a projecting bar oriented to be conveniently moved from the first to the second position to permit the members to be separated and which then returns to the first position when released.

These and other features of the present invention will be apparent to those skilled in this art from the following description of a preferred embodiment.

BRIEF DESCRIPTION OF THE DRAWINGS

The invention will be further described in connection with the accompanying drawings in which.

DETAILED DESCRIPTION

Figure 1:
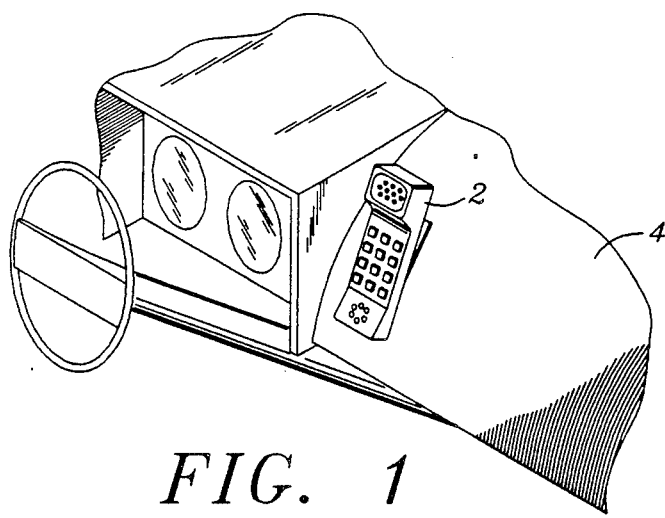
FIG. 1 is a perspective view of a portion of an automobile dashboard showing a cellular telephone handset connected thereto.
Figure 2:
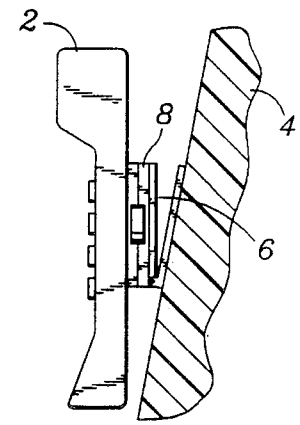
FIG. 2 is a side view of the telephone handset shown in FIG. 1, and of its attachment to the dashboard by a snap release attachment system.
Figure 6:
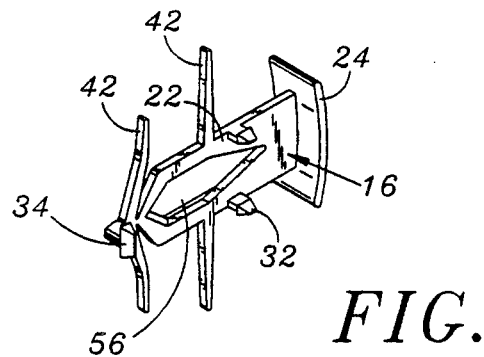
FIG. 6 is a perspective view of the catch plate of the snap release attachment system.

The preferred snap release attachment system is designed and intended to attached the base of a cellular telephone to an appropriate mount. As shown in FIGS. 1 and 2, the telephone handset 2 may be attached to the dashboard 4 of an automobile by a bracket 6, often referred to as a clam shell mount. Such an attachment is a permanent one; it does not permit the handset to be easily removed from the dashboard.

Figure 3:
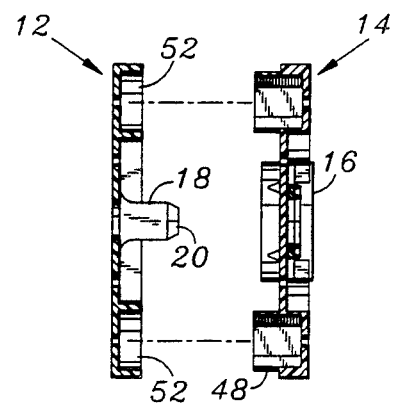
FIG. 3 is an elevational view in section of the snap release attachment system shown in FIG. 2.

By incorporating the preferred snap release attachment system, shown in cross-section in FIG. 3 and in greater detail in subsequent Figures, between the handset and the clam shell mount, the handset may be easily removed from the clam shell when desired, then reconnected by a quick and simple operation; both the disconnection and the reconnection easily may be performed by one hand and with only minimal attention.

Figure 4:
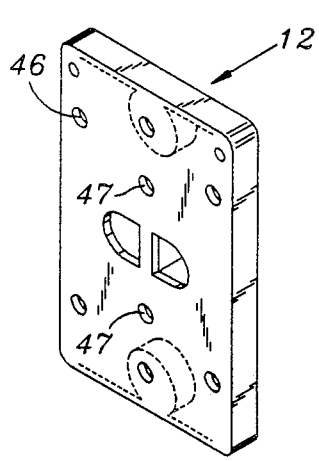
FIG. 4 is a perspective view of the top plate of the snap release attachment system.

As shown in cross section in FIG. 3 and separately in FIGS. 4 though 6, the snap release attachment system 8 consists of a top plate 12, a base plate 14 and a catch plate 16, the base plate receiving the catch plate to form a base member. While the base member is shown in the drawings as being attached to a clam shell mount 6, if desired it may be attached directly to a portion of the automobile; shims may be used between the base member and the automobile to cant the handset at the desired angle.

The top plate 12 includes a centrally located stud 18 that is generally T-shaped, the shaft of the T being located at the center of the base plate and projecting perpendicularly away from the base plate. The outer end of the T-shaped stud includes a transverse head 20 which, as shown best in FIG. 9, is hexagonal shaped, the outer ends of the head being pointed, the outer surface of the T-shaped head being chamfered or mitered for a purpose which will be described subsequently herein.

Figure 7:
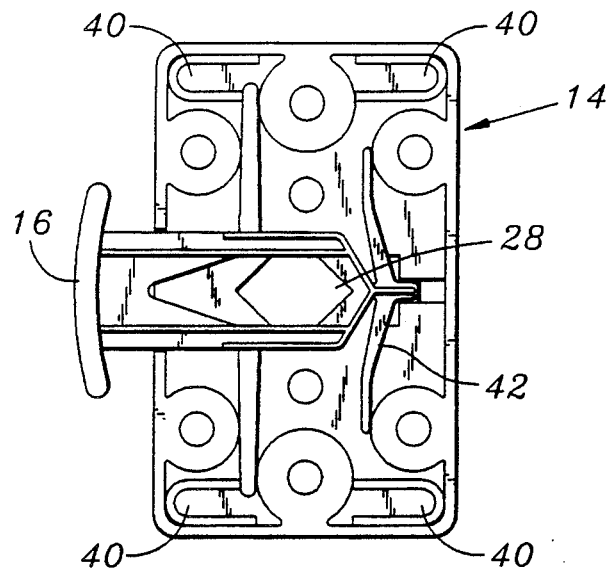
FIG. 7 is a bottom view of the base member assembled to illustrate how the base plate and catch plate interfit with one another.
Figure 8:
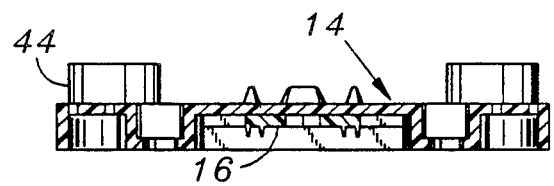
FIG. 8 is a sectional view, taken on lines VIII—VIII of FIG. 7, further illustrating how the base plate and catch plate interfit with one another.
Figure 9:
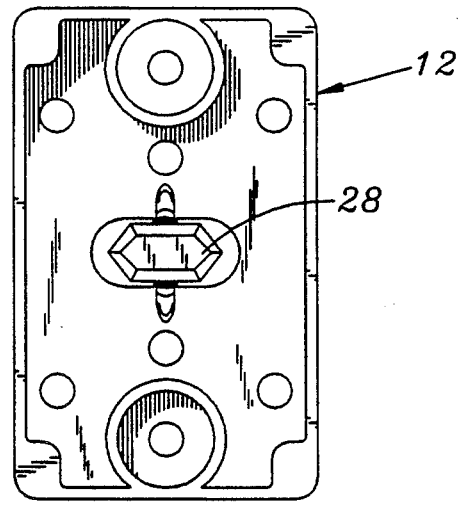
FIG. 9 is a bottom view of the top plate.

The base plate 14 receives a catch plate 16 as shown best in FIGS. 7 and 9, to form the base member assembly. The catch plate 16 includes a flat central plate portion 22 at the outer end of which is a transverse bar 24 that normally is positioned to the side of the base plate 14 with sufficient clearance between the bar and the side of the handset plate that the bar may be depressed.

The catch plate 22 includes three fingers projecting perpendicularly away from the plane of the flat central plate, a pair of fingers 32 being located on either side of the flat plate near bar 24, the third finger 34 being located at the far end of the flat plate. These three fingers project through openings in the base plate, fingers 32 projecting through openings 36 and finger 34 projecting through opening 38. Preferably fingers 32 include outwardly projecting margins or ledge portions which overhang the surface of the base plate to thereby hold the catch plate to the base plate. By virtue of the location and shape of the openings, and this interconnection, the catch plate may move laterally or transversely relative to the base plate a given amount, but not an the amount sufficient to permit finger 34 to move into the transverse portion of opening 38 and thereby be capable of moving out of that opening; instead, the head of finger 34 is held in the shaft portion of the T-shaped opening as the catch plate is moved back and forth by depressing bar 24.

To dampen or prevent clattering or rattling of plates 12 and 14 against one another when interconnected, base plate 14 includes fingers 40 that each has a knob at its tip. When the plates are connected, these knobs bear on the opposed corner bosses of plate 12 and preload or urge the plates apart, thereby to both assist in separating the plates and to dampen movement of the plates relative to one another.

Catch plate 16 also includes outwardly projecting spring fingers 42. As shown in FIG. 7, the base plate 14 incorporates a collection of rounded bosses 44 against which the outer ends of the fingers bear. These fingers tend to force the catch plate transversely outwardly relative to the base plate to hold bar 24 at its outer limit of travel, this outer limit being defined by the cooperation of fingers 3 and slots 36.

Figure 5:
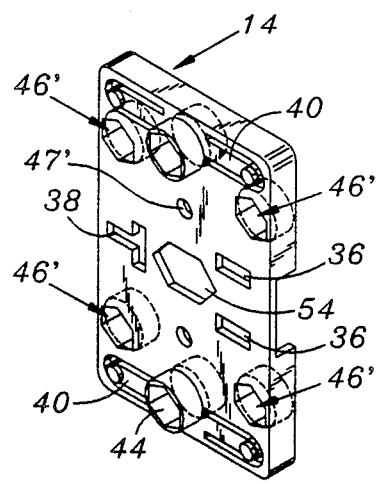
FIG. 5 is a perspective view of the base plate of the snap release attachment system.

The top plate 12 and the base plate 14 include appropriate openings 46 and 46' (FIG. 5) to permit each to be connected to its adjacent structure, the base plate to the clam shell and the top plate to the telephone handset. Preferably the plates also included aligned openings 47 and 47' to receive connectors to permit power to be applied to the handset unit to charge its batteries, for example.

The base plate also preferably includes a set of upstanding bosses 48 that are symmetrically positioned with respect to the base plate. The top plate incorporates a set of symmetrically positioned sockets 52 for receiving bosses 48, the bosses and sockets cooperating to assist in aligning the base and the top plate for reattachment of the plates.

To attach the base plate to the top plate it is only necessary to approximately position the handset over the base plate. Moving one slightly relative to the other causes bosses 48 to be aligned with sockets 52, thereby correctly orienting the two plates relative to one another and allowing them to be moved into face to face engagement, the T-shaped stud 18 projecting from the to plate and passing through an hexagonal opening 54 centrally located in the base plate and an opening 56 in the catch plate. As the chamfered or mitered head of the T-shaped stud engages the hexagonal shape point of opening 56 nearest finger 34, it tends to move, cam or urge the catch plate in a direction to move bar 24 towards the side of the base plate an extent sufficient to permit the head of the T-shaped stud 18 to pass the catch plate 16. When this occurs, spring fingers 42 move the catch plate back into its normal position thereby causing the end portion of opening 56 adjacent finger 34 to underlie the head of the stud 16 thereby connecting the base plate to the handset assembly.

To disconnect the handset assembly from the base plate, it is only necessary to momentarily depress bar 24, moving it towards the side of the base plate. This in turn permits fingers 40 to move the catch plate sufficiently to free the head 20 of stud 18 and to permit the base member to be separated from the top plate.

Thus the snap release attachment system of the present invention permits the user to easily disconnect the handset assembly from the base member plate with one hand, and with minimal attention. Also, because of its self-aligning feature and because, by pressing the top and base member assembly together, the catch plate may be caused to snap under the head of the T-shaped stud and to reconnect these members without requiring significant attention by the user. Thus, the snap release attachment system of the present invention is quite easy to use, as well as being simple and reliable in construction and inexpensive to manufacture. The system also permits handsets to be interchanged among different base members, if desired.

Modifications in the preferred construction of the snap release attachment system will be apparent to those skilled in this art. For that reason, the scope of the invention is not limited to the preferred embodiment shown and described, but instead is set forth in the accompanying claims.

We claim:

1. A snap release system for attaching a first element to a second element, the system comprising:
   a planar base member for connection to the first element;
   a planar top member for connection to the second element;

one of said members having a projecting stud; the other of said members having a socket for receiving said stud when said members are brought together in a face to face orientation;

means for releasably holding said stud in said socket, said means for releasably holding being normally in a first position but being cammed to a second position as the members are brought into face to face engagement to automatically capture and hold said stud in said socket and said members together; and a plurality of sockets on said one of said members and a plurality of bosses on said other of said members displaced from the centrally located stud so that bosses and sockets are co-linear in the plane of face to face engagement for aligning said members as they are brought into face to face engagement.

2. A snap release system as set forth in claim 1, said means for releasably holding the stud in the socket including a projecting bar, spring means for holding said bar in a first orientation but permitting said bar to be moved to a second orientation to release the stud from the socket.

3. A snap release system as set forth in claim 2 wherein the spring means urges the bar toward the stud, but permits the bar to be pressed away from the stud sufficiently to release the stud from the socket.

4. A snap release system as set forth in claim 1 in which the projecting stud is T-shaped and comprises a shaft and a head, said shaft being centrally located on and perpendicular to the plane defined by one of said planar members, said head of the T-shaped stud being received in said socket.

5. A snap release system as set forth in claim 4 in which said means for releasably holding the T-shaped stud in the socket includes a plate, means for holding the plate to one of the said members in an orientation permitting the plate to slide in a plane parallel to the plane defined by said member holding the plate such that the plate underlies and moves relative to said socket, the plate including an opening to receive the head of the T-shaped stud, spring means urging the plate to an alignment relative to the member not holding the plate to align said opening and socket such that a portion of the plate adjacent said opening captures the head of the T-shaped stud in the socket.

6. A snap release system as set forth in claim 5 including means for camming the plate relative to the member holding the plate as the members are pressed together in a face to face orientation to permit said head of the T-shaped stud to pass into an opening in said plate, thereby to releasably connect said base and top members to one another.

7. A snap release system as set forth in claim 6 in which said cam means includes a sloped surface on at least one of the head of said T-shaped stud and the portion of the plate defining said opening, the sloped surface causing the plate to move parallel to the plane defined by said member holding the plate as the base and top members are pressed together.

8. A snap release system as set forth in claim 7 in which said plate includes a bar exterior to and spaced from the member holding the plate sufficiently to permit it to be moved away from the socket to an extent sufficient to release the head of the stud from being captured in the opening of said plate member and to release the base and top members from one another.

9. A snap release system as set forth in claim 8 in which said spring means includes at least one elongated resilient finger projecting from said plate and engaging a portion of said member holding the plate to urge the plate in a direction parallel to the plane defined by the member holding the plate.

* * * * *